Aug. 26, 1958   H. D. ANSPON ET AL   2,848,753
PRODUCTION OF POLYMERIC α-CHLOROACRYLATE SHEETS
Filed June 1, 1953
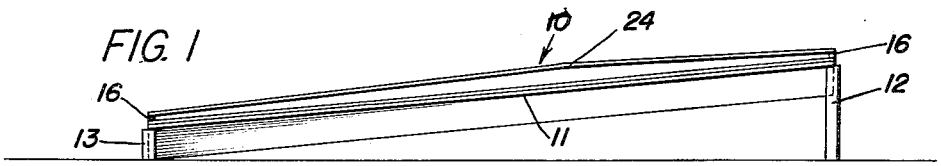
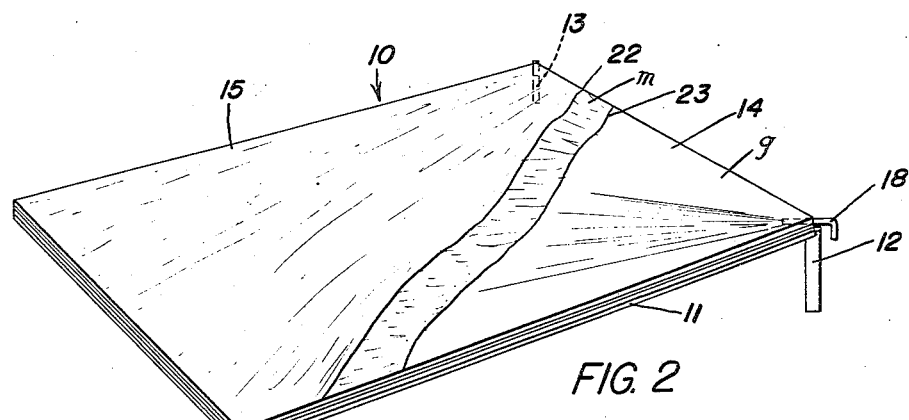
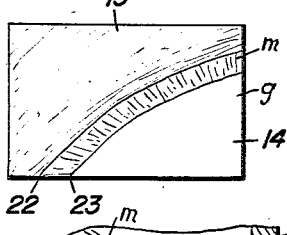
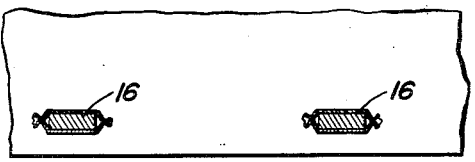
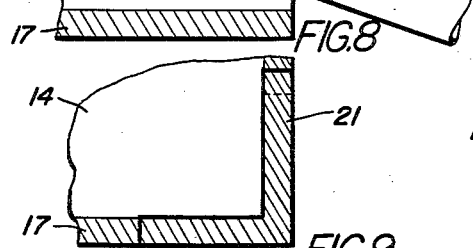
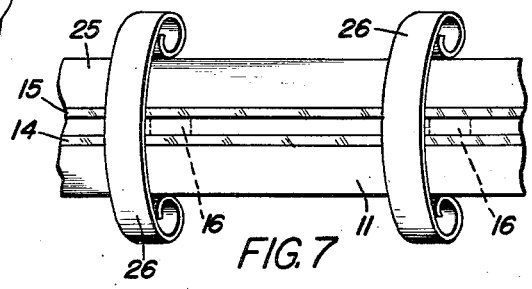
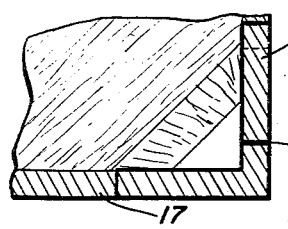
INVENTORS.
HARRY D. ANSPON
FRANK E. PSCHORR
BY
ATTORNEYS United States Patent Office 2,848,753
Patented Aug. 26, 1958

2,848,753

PRODUCTION OF POLYMERIC α-CHLORO-
ACRYLATE SHEETS

Harry D. Anspon, Easton, and Frank E. Pschorr, Phoenixville, Pa., assignors to General Aniline & Film Corporation, New York, N. Y., a corporation of Delaware Application June 1, 1953, Serial No. 358,974

9 Claims. (Cl. 18—58)

This invention is directed to a method of producing polymeric α-chloroacrylic acid ester sheets of uniform thickness.

High quality transparent polymeric sheets are most often obtained by casting a monomer or a monomer-polymer solution in a casting cell constructed of plate glass sheets arranged in a parallel face-to-face relationship. These cells are usually made by separating two identical sheets of polished plate glass with spacers and sealing the edges of the cell with a paper edge seal, flexible tubing or the like. In the casting of polymer sheets of relatively small dimensions such as 30" x 30" x ¼" sheets in casting cells constructed of ¼" thick glass sheets, the thickness dimensions across the polymer sheet cast in a horizontal position and supported at the edges are usually fairly uniform, varying as little as 0.009" from a minimum of 0.244". However, when relatively large polymer sheets are desired, as for example 48" x 72" x ¼", the bowing and bulging of the polymer sheets due to the weight of monomer and glass becomes serious, the thickness variation across sheets cast in cells constructed with two ¼" thick plate glass sheets running above 0.129" across the polymer sheet from a minimum of about 0.262". The thickness in such case is greatest at the center due to the bowing and bulging of the glass.

In solving the problem of the bowing or bulging of casting cells constructed of two plate glass sheets, the obvious expedient would ordinarily be to employ thicker and more rigid glass sheets. It has in fact been found that as the thickness of the glass sheets in the casting cell is increased, the thickness dimensions of the polymer sheet cast therefrom become more uniform. However, this expedient is undesirable and disadvantageous from several aspects. With an increase in thickness of the glass for casting cells from ¼" to ⅜" the cost of the glass in the cell is approximately doubled. Such an increase in the thickness of the glass also results in an increase in the weight of the casting cell by about 50 percent. Since the weight of the casting is an important factor with respect to ease of handling, such a weight increase over the already relatively substantial weight of a casting cell made with ¼" glass plates is highly undesirable. Further, the inherently poor heat transfer properties of the thicker glass plates decrease the speed, efficiency, and ease of control of the subsequent polymerization step in addition to resulting in the production of polymer sheets with non-uniform properties due to the uneven rates of polymerization and the like.

The instant invention comprises a process for obtaining good thickness tolerances in polymer sheets cast in relatively large cells made of relatively thin and flexible cell walls. In general, the process comprises supporting in inclined position on a flat rigid supporting surface a casting cell composed of upper and lower flat or planar cell walls edge-sealed and provided with spacers around the periphery thereof, said upper cell wall being relatively thin and flexible, filling the cell with the calculated amount of liquid monomer through an opening in the edge seal at the uppermost portion of the cell, forcing a second flat rigid surface on the upper cell wall to maintain it in flat, parallel relationship to the lower cell wall and sealing the opening at the uppermost part of the casting cell when the level of the monomer in the cell is immediately adjacent thereto. The monomer is then subjected to gelling conditions in the cell after which the top and bottom flat rigid surfaces are removed if desired, the spacer thickness dimensions in the casting cell reduced to compensate for polymerization shrinkage, and the gel subjected to polymerizing conditions.

The process of this invention is peculiarly adapted for the production of high quality sheets of α-chloroacrylic acid esters such as methyl α-chloroacrylate. Whereas most other monomers yielding thermoplastic polymers during polymerization gel late during the polymerization stage, α-chloroacrylic acid esters gel before appreciable polymerization shrinkage has occurred. Hence, the prior technique of adding monomer-polymer syrup to the mold or casting cell to compensate for shrinkage is of little or no use in casting α-chloroacrylic acid esters. In addition, α-chloroacrylic acid ester monomers are skin vesicants and lachrymators whereby their handling is hazardous and difficult due to the safety measures which must be taken such as use of masks, rubber gloves, and the like. Further, in contrast with other monomers such as methyl methacrylate, α-chloroacrylic acid esters polymerize more readily in contact with air whereby areas of pullaway occur adjacent to the spots where air has been permitted to contact the surface of the monomer during polymerization. Still further, α-chloroacrylic acid esters polymerized in contact with air have poor heat stability, and resultant polymer castings tend to be discolored.

In the process of the instant invention, the amount of monomer necessary to completely fill a casting cell made with rigid, flat, parallel cell walls is precalculated. This precalculated amount of monomer, preferably in the form of a liquid with a viscosity approaching that of water is then placed in a casting cell provided with peripheral spacers to control the thickness of the cell and resting on a lower flat rigid supporting member in inclined position, at least the upper cell wall of the casting cell being relatively thin and flexible. The low viscosity avoids the problem of trapped bubbles encountered in casting monomer-polymer syrups. Due to the fact that the upper cell wall is relatively thin and flexible, it is bent up or bowed outwardly by the weight of monomer whereby there remains a good deal of space between the monomer liquid level and the filling-opening. The filling-opening should be as small as possible to permit its being readily and quickly sealed after the top rigid supporting surface has been placed on the casting cell and the liquid level thereby forced up to the filling-opening. In fact, it is preferable to seal the filling-opening completely after the monomer has been placed in the casting cell which latter is thus outwardly bowed by the weight of the contents. After the top flat rigid member has been placed on the casting cell subsequent to the filling step, the top and bottom rigid supporting members are drawn together under suitable tension by any means as for example by clamping under tension with spring clamps placed around the periphery of the casting cell. A pin hole is then punctured in the edge seal at the uppermost part of the casting cell, which is preferably a corner thereof, whereby the gas in the cell above the monomer liquid level, which is under pressure, is allowed to escape. The pin hole is then readily and quickly sealed when the monomer liquid level is close to or substantially at said pin hole in the uppermost part of the cell edge seal.

After the monomer in the casting cell has been allowed to gel, it may be moved and handled without fear of disturbing the dimensions of the polymer sheet. After gelation, both of the flat rigid members are preferably removed from the casting cell so that it may be uniformly and evenly heated and cooled during subsequent polymerization. Before the subsequent polymerization and its attendant shrinkage is allowed to occur, however, the spacers must be removed or dimensions altered by melting or the like in order to allow for the said shrinkage. The manner of removal of the spacers will obviously depend upon the positioning and the character of the spacers being employed. The gelling and subsequent polymerization steps are preferably carried out while the casting cell is in a substantially horizontal position in order to minimize stresses on the edge seals and to minimize any possibility of any changes in the dimensions of the polymer sheet taking place. The polymerization of the sheet in the casting cell may be carried out by any known means, as for example, by means of catalysts, heating, ultra-violet irradiation and the like, or any combination thereof. After polymerization is complete, the cell is removed from the oil bath and the cells opened and the sheet removed (preferably by the process of U. S. Patent 2,593,827 if the polymer sheet is relatively thin).

In the casting of α-chloroacrylic acid esters to produce high quality sheets therefrom, it is desirable to take proper precautions to prevent undue contact with air, to prevent premature gelling, and the like. The cell may be filled with an inert gas such as nitrogen or the like prior to addition of the monomer. The monomer may be first purified by careful fractional distillation, by $P_2O_5$ treatment and flash vacuum distillation, or by steam distillation from a dehydrohalogenation treatment using picric acid as inhibitor, separated, and dried. The monomer is also preferably kept at very low temperatures, as for example from 0 to —35° C., up to the time it is poured into the casting cell. A catalyst such as dibutyl tin diacetate and/or di-tert-butyl peroxide may be added to the monomer so that gelling of the monomer in the cell may be accomplished at room temperature in a relatively short space of time such as about three hours or so. Other catalysts, ultraviolet irradiation and/or gentle heating may similarly be employed to gel the monomer in the casting cell.

The exact gelling and polymerizing conditions depend upon the activity of the monomer, i. e. its ease of polymerization. The ease of polymerization of the monomer is affected by its purity and by the absence or presence of inhibitors in the monomer. In addition, the activity of the catalyst and its concentration plays an important role in selecting the proper gelling and polymerizing conditions. The gelling and polymerizing conditions must be selected so that overheating due to too rapid polymerization is avoided. The only maximum limit on the length of time required to gel and polymerize the monomer is that imposed by economic operation of the casting process. The longer the time required to gel and polymerize the monomer, the more glass is tied up in casting cells and the more storage space is required for the cells.

The catalyst and its concentration, and/or the amount of irradiation and heat employed was usually so selected that gelling of the monomer was achieved in about 6 to 36 hours, although periods up to 48 hours have been employed to gel the monomer. The polymerization step in which the shrinkage occurs usually required 12 to 18 hours although periods up to 6 days have been employed.

By gelling is meant the attainment of a viscosity sufficiently great that liquid flow of the polymer-monomer solution does not occur (viscosity like "Jello").

The function of the spacers employed in the casting cell is to separate the cell walls and keep them from collapsing until after the monomer in the cell has gelled. They may be made of any suitable material in any size and shape. As stated above, α-chloroacrylic acid esters are peculiar in that they may be polymerized to a gel state with very little attendant polymerization shrinkage, the predominant amount of shrinkage occurring during polymerization subsequent to gelling. Since very little shrinkage occurs during the gelling operation, areas of pullaway do not occur around the spacers during gelling. However, the spacer dimensions in the casting cell must be sufficiently reduced before the shrinkage attendant upon further polymerization takes place in order to compensate for the resulting decrease in thickness of the polymer sheet. The spacers must accordingly be made either of flexible materials or materials soluble in the monomer and dissolving therein, or they may be capable of being removed mechanically or otherwise. Flexible spacers of resilient or rubbery material or the like, spacers which dissolve in the monomer or monomer-polymer mass, and non-flexible insoluble spacers such as those made of glass, phenolic or other resins, or the like which must be mechanically removed prior to shrinkage may all be employed but are subject to various objections.

It is accordingly preferred to use in the instant invention fusible spacers which may be melted before polymerization shrinkage is allowed to take place. The production and use of such fusible spacers are disclosed and claimed in copending application Serial No. 356,891, filed on May 22, 1953 by Harry D. Anspon. Said fusible spacers are of low melting, dimensionally stable materials such as low melting organic monomolecular compounds or polymers, low melting inorganic monomolecular compounds or polymers, and low melting metals and alloys, all of which should have definite melting points above the temperature of the initial gelling step, but preferably no higher than the temperature of polymerization of the α-chloroacrylic acid ester sheets. In general, such melting points should be between 35 and 100° C., and preferably from 45 to 60° C. Their boiling points should obviously be well above the temperature of polymerization and preferably about 200° C. at atmospheric pressure. The spacer materials should also be preferably insoluble in the α-chloroacrylic acid ester monomer being cast.

The preferred spacer material for use in the instant invention is an amalgamated metal alloy, made of 80 percent Wood's metal and 20 percent mercury, with a melting point of 53° C. Although not absolutely necessary, it is preferred to wrap these spacers in small flexible bags of regenerated cellulose or the like to provide space for melting of the spacer material so that no resistance to polymerization shrinkage arises, to prevent the spacer material from contaminating the monomer, and to provide a gas space around the spacer which gas space will serve as insulation to prevent heat loss when infrared spot heating is used to melt the spacers. The latter method of melting the spacers has certain advantages, but the spacers may also be melted by means of a short heating step prior to the main polymerization step. This may be carried out in the same bath, such as an oil bath, in which the polymerization of the sheet occurs. The spacer material may be recovered from the finished polymer sheet by either sawing or knocking the spacer material out of the flexible bags or by melting the spacer material from the polymer edge scraps.

While regenerated cellulose is a cheap, readily available inert and preferred material for construction of the flexible bag spacer wrappers, the following inert materials may also be employed: metal foils such as aluminum foil, copper foil, lead foil, tin foil and the like, parchment paper or a similar non-porous paper free of waxes, synthetic polymeric films such as biaxially stretched film of the polyester of ethylene glycol and terephthalic acid (du Pont's Mylar), polyethylene film, polyvinyl alcohol film (this film should be nearly completely hydrolyzed and should contain a minimum of remaining acetate groups), polyvinylidene chloride film (Dow's Saran), nylon film and the like. This wrapper material should not be dissolved by the α-chloroacrylate monomer. It should be uniform in thickness and impervious to passage of the monomer in those cases when a spacer material is used which is soluble in the monomer. The wrapper should be sufficiently thin and pliable so that it offers little resistance to the movement of the casting plates during polymerization shrinkage. A transparent wrapper is preferred for convenience in ascertaining the fit of the wrapper about the spacer and in estimating the volume of gas space enclosed in the wrappers. The wrapper material should have little or no effect on the polymerization of adjacent monomer; and the wrapper should not be attacked by the melted spacer, in order to prevent any contact of polymer with melted spacer material where such contact would be detrimental to the properties of the polymer.

The top and bottom flat rigid surfaces which are employed in the instant invention may of course be of any thickness of suitable rigid material such as plywood, metal, composition board, or the like. Such surfaces should be as large as the casting cell wall surfaces and are preferably of approximately the same surface dimensions.

In the filling operation, the filling opening is preferably sealed immediately after the monomer has been poured into the casting cell and before the top flat rigid member has been placed thereon. The filling-opening may be sealed by placing a piece of filter paper coated with zein adhesive or the like over the opening, fastening it on firmly, and allowing it to dry for a few minutes if desired under infrared irradiation. After the top flat rigid member has been placed on the casting cell and clamped in position, and a gas escape pin hole made in the edge seal at the uppermost portion of the casting cell whereby the gas in the casting cell is allowed to escape and the monomer level rise up to the pin hole, the latter may be sealed in the same manner as before. The grade or angle of inclination at which the casting cell is held during the filling operation is of course not critical. Thus, the rise or increase in height may range from about ¼ to 6", preferably from about ½ to 2", for each 12" of casting cell length.

While the above description is limited to the use of cell walls made of plate glass, it will be obvious that the cell walls may be composed of any other suitable materials such as certain metals, woods, resinous materials and the like provided that they are inert to the α-chloroacrylic acid ester monomer and polymer being cast and have the required heat transfer and tensile properties. For example, polished plates of aluminum, stainless steel, nickel, Hastlelloy, Monel metal, Duriron and other metal alloys may also be employed for the cell walls.

It has also been stated that at least the upper cell wall must be relatively thin and flexible. Both cell walls may of course be relatively thin and flexible. The permissible thickness of a cell wall in any particular instance will obviously be interdependent on the properties of the materials from which it is made (heat transfer characteristics, rigidity, strength, etc.), and the weight, thickness and surface dimensions of the polymer sheet being produced. Thus, for a given cell wall material, for example plate glass, and thickness of polymer sheet, for example ¼", a ¼" thick cell wall would be rigid if employed in casting a 2' x 2' polymer sheet but flexible if employed in casting a polymer sheet with the same surface area but with dimensions of ½' x 8'. In utilizing the process of this invention, the worker skilled in the art may readily ascertain the thickness of the upper cell wall small enough to give it the flexibility required to allow its being bent, bulged or bowed when the cell of the desired size is filled in inclined position with the liquid monomer, but large enough to prevent gross distortion of the polymer sheet and casting cell during handling after removal of the flat rigid supporting surfaces from, and reduction of the spacer thickness dimensions in the cell containing the gelled monomer. By way of example only, it may be taken as a rule of thumb that when employing casting cells of plate glass to provide ¼" thick polymer sheets, the ratio of the longest rectangular dimension of the plate glass wall to its thickness should be at least 125 in order to be sufficiently flexible for the purposes of this invention. This minimum ratio would of course be different when the cell walls are made of different material and/or the cell employed to produce polymer sheets of other thicknesses. Actually, the ratio of longest dimension to plate wall thickness need not be low enough to support the gelled monomer in a level and horizontal plane. The 48" x 72" x ¼" plate glass sheets of a casting cell filled with gelled polymer actually sagged while they were held in a horizontal plane in air and supported on their edge prior to being lowered into the polymerization bath. The buoyant effect of the liquid bath undoubtedly reduced this sag and a bath could be chosen of such a density that the buoyant effect of the dispersed liquid would almost float the casting cell and hence would reduce the sag. Alternately, the sheet could be leveled in the oil bath by its being supported at points (points are used in order that circulation in the bath would not be impaired), over the outside surface of the bottom sheet of the casting cell in order to prevent sag. In practice however, once the monomer in the cell has gelled, the thickness variations over the sheet are set and the rubbery monomer-polymer gel prevents the glass sheets of the casting cell from separating even though they do sag for the glass sheets are effectively glued together by the polymer gel. However, if the polymer sheet was polymerized in a badly sagged cell, presumably the polymer sheet would be warped even though it possessed a uniform thickness. To prevent any warping the casting cell should be approximately level or its surfaces should be straight and not excessively curved during the polymerization step following the gelling of the monomer. It is believed that the gelled monomer could be polymerized in a bath while the casting cell is in a vertical position so long as the surfaces of the cell were straight and not curved.

While the process of the invention has been described, and is particularly advantageous with respect to methyl α-chloroacrylate, other esters of α-chloroacrylic acid may be cast in accordance with this invention, as for example, alkyl esters such as ethyl, propyl, isopropyl, butyl, amyl, isoamyl, hexyl, octyl or lauryl esters; alkenyl esters such as allyl, methallyl or crotyl esters; polyhydric alcohol esters such as ethylene glycol or 1,4-butanediol esters; cycloalkyl esters such as cyclohexyl or methylcyclohexyl esters; aralkyl esters such as the benzyl esters; aryl esters such as phenyl or tolyl esters; and heterocyclic esters such as the tetrahydrofurfuryl ester.

The following example, in which parts are by weight unless otherwise indicated, is illustrative of the instant invention and is not to be regarded as limitative.

*Example*

In order to produce a rectangular polymer sheet measuring 72" x 48" x ¼" a casting cell was constructed with two 72" x 48" x ¼" polished plate glass sheets held apart 0.325" by fusible spacers made of amalgamated Wood's metal alloy (80 percent Wood's metal, 20 percent Hg), at intervals of about 12 inches around the periphery of the casting cell. The edges of the casting cell were sealed with a zein-coated paper edge seal. The casting cell was then placed in an inclined position (one inch of rise per 12" of inclined length along the diagonal of the rectangular cell) on a 72" x 48" x 2" piece of plywood with one corner higher than the others, and the calculated amount of monomer composition (17.4 liters at —35° C.) required to fill the 1123.2 cu. in. (18 liters at 25° C.) casting cell, and containing 0.032 percent di-tert-butyl peroxide and 0.06 percent dibutyl tin diacetate, was inserted at —35° C. through a filling-opening in the upper corner.

After all of the monomer had been added to the casting cell, a piece of filter paper coated with zein adhesive was placed over the filling-corner, fastened on firmly and allowed to dry for a few minutes by irradiation with an infrared lamp. A 72" x 48" x 1½" piece of plywood was then placed on top of the casting cell and clamped to the bottom piece of plywood by means of several spring clamps fastened around the periphery thereof. A gas escape pin hole was made in the edge seal at the filling-corner, and the gas in the casting cell, now under a slight pressure, was allowed to escape slowly. When practically all the gas had escaped and the monomer level was close to the pin hole opening, a seal of zein adhesive coated filter paper was quickly applied over the pin hole and set with infrared heat.

The casting cell assembly was next allowed to gel by standing in a horizontal position in the dark at room temperature overnight after which the top and bottom pieces of supporting plywood were removed and the casting cell lowered into an oil bath. The temperature of the oil bath was then raised to 60° C. and held at that temperature for about 1¼ hours to allow the spacers to melt, whereafter the oil bath was cooled quickly to 40° C. to allow better control of the subsequent exothermic polymerization process. Polymerization was allowed to continue for about 12 to 18 hours until no further shrinkage occurred. The temperature of the oil bath was then raised to 120° C. for 22 to 24 hours to insure complete polymerization. The casting cell was then removed from the oil bath and dismantled. The resulting polymer sheet was of high optical quality and of substantially uniform thickness dimensions. It had a thickness of 0.263"±0.008".

A polymer sheet prepared by filling a casting cell from the same formulation and in substantially the same manner, but without the use of a top covering piece of rigid plywood, had a thickness of 0.326"±0.064".

In the accompanying drawing which illustrates the construction of a casting cell used in practicing our invention, Fig. 1 is a side elevational view of the inclined cell which may be employed in carrying out the method of our invention, showing the top sheet bulged as when the calculated amount of monomer is charged therein, Fig. 2 is a perspective view of said inclined cell, Figs. 3, 4 and 5 are detail views on a smaller scale of the several stages of procedure of our method, Fig. 6 is a detail view showing the spacers in position between the plate glass sheets, Fig. 7 is a detail view showing spring clamps in position for holding the plate glass sheets and plywood boards in position after the space between the plate glass sheets had been filled with the monomer, and Figs. 8, 9 and 10 are fragmentary views showing the means for filling, sealing and venting the cell.

Referring now more specifically to the several views of the drawings, reference numeral 10 indicates generally an inclined casting cell structure supported on a rigid plywood board 11 mounted on leg 12 and shorter legs 13 so that one corner is higher than the others. The cell structure comprises two plate glass sheets 14 and 15 which are separated from each other a distance equal to the thickness of the polymeric α-chloroacrylate sheet being produced by spacers 16 placed around the edges of the plate glass sheets and have sealed edges 17. The spacers 16 are of the type described in said application Serial No. 356,891.

In use, the casting cell formed by the plate glass sheets is filled with a calculated amount of monomer composition $m$ by means of a tube 18 extending between the glass sheets through an opening 19 in the sealed edges 17. When the calculated amount of monomer composition has been supplied to the cell the tube 18 is withdrawn, the opening 19 is sealed as shown at 21 in Fig. 9. The cell will appear as is shown in Figs. 2 and 3, the liquid/top plate interface being indicated by line 22 and the liquid/lower plate interface by line 23, with gas filling the empty space between the plates at $g$. The glass plates, particularly plate 15, are of such thickness and flexibility that, when the monomer is in the cell as shown in Figs. 2 and 3, the monomer will cause the glass plate 15, i. e. the upper cell wall, to bulge or bow as shown at 24 in Fig. 1. This feature permits the calculated amount of monomeric composition to assume the desired position in the casting cell whereby later the gas may be eliminated.

Now, a plywood board 25 is placed on top of the casting cell and clamped in position, as shown in Fig. 7, by several spring clamps 26, only two of which are shown. The bulge or bow in the upper cell wall is flattened out so that the cell appears as is shown in Fig. 4. A pin hole 27 is made in the seal 21 at the filling corner and the gas in the casting cell, now under slight pressure, escapes slowly. When substantially all of the gas has escaped and the monomer composition level is close to the pin hole, as shown in Figs. 5 and 10, the pin hole 27 is sealed. Then polymerization of the monomer composition in the casting cell is effected to form the desired polymeric sheets.

Various modifications and variations of this invention will be obvious to persons skilled in the art and it is to be understood that such modifications and variations are to be included within the purview of this application and the spirit and scope of the appended claims.

We claim:

1. In a method of producing a polymeric α-chloroacrylate sheet, the steps comprising supporting in inclined position on a flat rigid member a casting cell composed of upper and lower flat cell walls edge-sealed and provided with spacers around the periphery thereof, said upper cell wall being relatively thin and flexible, filling the cell through an opening in the edge seal at the uppermost portion thereof with an amount of liquid α-chloroacrylic acid ester monomer sufficient to completely fill the casting cell when the cell walls are in parallel relationship, forcing a second flat rigid member having approximately the same surface dimensions as the cell walls on the upper cell wall so that said upper cell wall is substantially in parallel relationship with said lower cell wall, and sealing the opening at the uppermost portion of the cell when the level of the monomer in the cell is immediately adjacent thereto, all while maintaining said casting cell in inclined position.

2. A method as defined in claim 1 wherein the cell walls are of plate glass sheets, at least one of said plate glass sheets being relatively thin and flexible.

3. A method as defined in claim 1 wherein the α-chloroacrylic acid ester is methyl α-chloroacrylate.

4. In a method of producing a polymeric α-chloroacrylate sheet, the steps comprising supporting in inclined position on a flat rigid member a casting cell composed of upper and lower flat cell walls edge-sealed and provided with spacers around the periphery thereof, said upper cell wall being relatively thin and flexible, filling the cell through an opening in the edge seal at the uppermost portion thereof with an amount of liquid α-chloroacrylic acid ester monomer sufficient to completely fill the casting cell when the cell walls are in parallel relationship, sealing the filling opening in the edge seal, forcing a second flat rigid member having approximately the same surface dimensions as the cell walls on the upper cell wall so that said upper cell wall is substantially in parallel relationship with said lower cell wall, forming a small gas escape opening in the edge seal at the uppermost portion of the casting cell, and sealing said gas escape opening when the level of the monomer is immediately adjacent thereto, all while maintaining said casting cell in inclined position.

5. A method as defined in claim 4 wherein the cell walls are of plate glass sheets, at least one of said plate glass sheets being relatively thin and flexible.

6. A method as defined in claim 4 wherein the α-chloroacrylic acid ester is methyl α-chloroacrylate.

7. A method of producing polymeric α-chloroacrylate sheets comprising supporting in inclined position on a flat rigid member a casting cell composed of upper and lower flat cell walls edge-sealed and provided with spacers around the periphery thereof, said upper cell wall being relatively thin and flexible, filling the cell through an opening in the edge seal at the uppermost portion thereof with an amount of liquid α-chloroacrylic acid ester monomer sufficient to completely fill the casting cell when the cell walls are in parallel relationship, forcing a second flat rigid member having approximately the same surface dimensions as the cell walls on the upper cell wall so that said upper cell wall is substantially in parallel relationship with said lower cell wall, sealing the opening at the uppermost portion of the cell when the level of the monomer in the cell is immediately adjacent thereto, all while maintaining said casting cell in inclined position, subjecting the monomer to gelling conditions, removing said two flat rigid members from the casting cell, reducing the spacer thickness dimensions in the casting cell to compensate for shrinkage during polymerization, and subjecting the gel to further polymerizing conditions.

8. A method as defined in claim 7 wherein the cell walls are of plate glass sheets, at least one of said plate glass sheets being relatively thin and flexible.

9. A method as defined in claim 7 wherein the α-chloroacrylic acid ester is methyl α-chloroacrylate.

References Cited in the file of this patent

UNITED STATES PATENTS

| | | |
|---|---|---|
| 2,328,525 | Egolf | Aug. 31, 1943 |
| 2,369,593 | Marks et al. | Feb. 13, 1945 |
| 2,379,218 | Dial et al. | June 26, 1945 |
| 2,409,958 | Rogers et al. | Oct. 22, 1946 |
| 2,593,827 | Anspon et al. | Apr. 22, 1952 |